July 16, 1935.  J. E. POINTON ET AL  2,008,036
MACHINE FOR DEPOSITING DOUGH PIECES IN PANS
Filed May 17, 1934  3 Sheets-Sheet 3
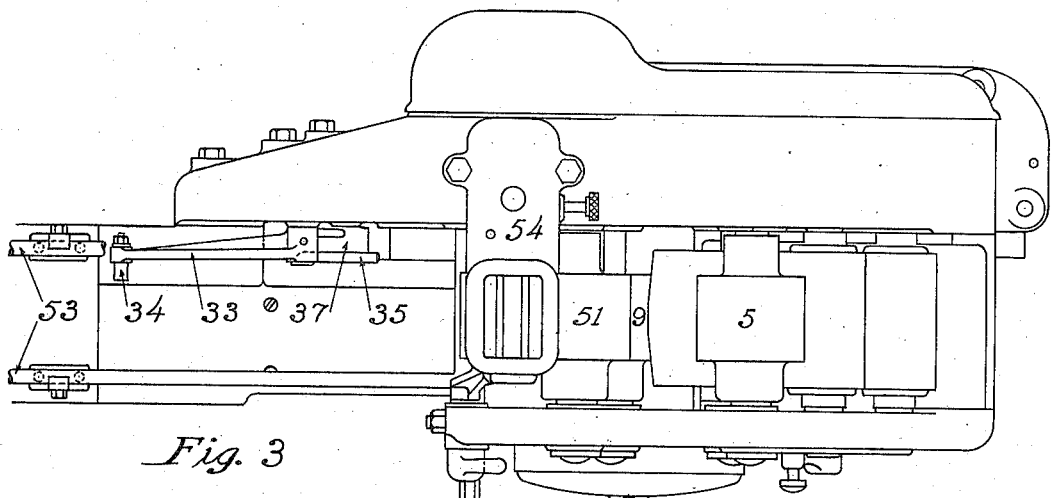
Fig. 3
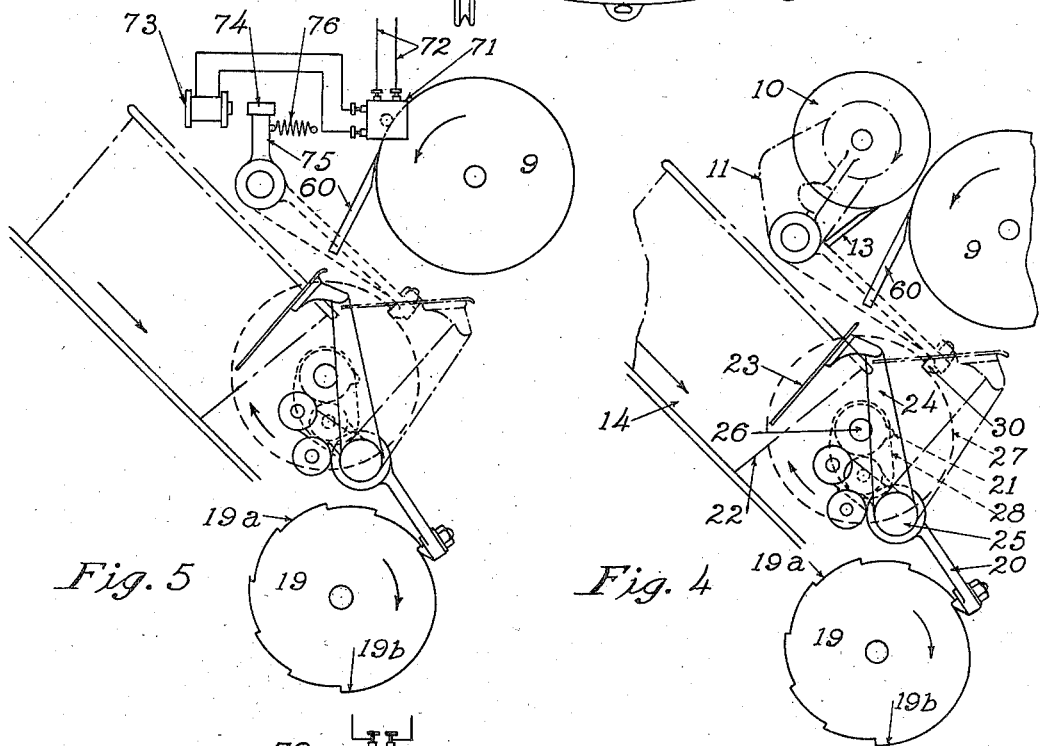
Fig. 5  Fig. 4
Fig. 6
Inventors
LAURENCE S. HARBER
JOHN E. POINTON
By George B. Willcox
Attorney Patented July 16, 1935

2,008,036

UNITED STATES PATENT OFFICE 2,008,036

MACHINE FOR DEPOSITING DOUGH PIECES IN PANS

John Edward Pointon and Laurence Seymour Harber, Westwood Works, Peterborough, England, assignors to Baker Perkins Company, Inc., Saginaw, Mich., a corporation of New York Application May 17, 1934, Serial No. 726,102
In Great Britain May 23, 1933

9 Claims. (Cl. 107—7)

This invention relates to machines for the handling and feeding of bread dough pieces, and is especially applicable to the manufacture of bread as described in our application for U. S. Letters Patent, No. 667,076, filed April 20, 1933.

An object of the invention is to provide mechanism adapted to stack flattened pieces, discs, or plaques of dough on edge in a baking tin or container substantially at right-angles to the longitudinal axis of the tin or container.

Another object of the invention is to provide means adapted to ensure the delivery or positioning of dough pieces in a regular succession or series of groups each comprising a predetermined number of pieces irrespective of irregularities in the rate of delivery of the supply of dough pieces, and further to secure the regular stacking in a tin of each such group of dough pieces irrespective of any irregularities of supply.

The invention consists in a panner blade or guide for the dough pieces between which and a baking tin or a container relative to and fro movement is effected for feeding the dough pieces in succession, so that the panner blade occupies a position within the tin or container while depositing or guiding each dough piece into the tin in stacked relationship to the pieces previously deposited. The blade prevents the piece of dough being deposited from striking or sticking to the adjacent piece already in the tin.

The invention further consists in the panner blade described above in combination with means for giving the tin or container a travel (preferably step by step) transversely to the direction of the to-and-fro movement of the panner blade.

A further feature of the invention consists in a detecting device actuated by the passage of dough pieces adapted to control the operations of delivering dough pieces to baking tins or containers, for example, the operation of the panner blade or delivery device and the step-by-step travel of the tin or container transversely to the direction of delivery of the dough pieces.

A preferred embodiment of the detecting device comprises a displaceable roller or other member which is moved by a passing dough piece, the displacement being utilized to acutate directly, or through a relay, the means it is adapted to control. Alternatively, the detector may be in the form of a light-sensitive cell, arranged so that the interruption of a light ray by a dough piece at the critical position electrically operates the controlled means.

As applied to the stacking of flattened dough pieces, discs, or plaques to baking tins, the detecting device governs the motion of a conveyor adapted to feed forward on an incline a series of tilted baking tins so that each tin is given a step-by-step or intermittent feeding motion and at the same time actuates the panning blade for feeding or guiding the dough pieces as discharged from the detecting position into the tins one after another to form an inclined stack. The stepwise feeding mechanism of the baking tin conveyor may feed the tins forward a series of equal steps corresponding with the number and thickness of the dough pieces and then move them forward a longer distance to skip the interval between consecutive tins.

The filled tins then may be discharged to a conveyor for passing them to a further proofing stage and thence to an automatic or hand-feeding station for an oven.

In the accompanying drawings Figure 1 is a side view of a machine for forming flattened discs of dough and delivering them in succession to baking tins according to the invention.

Figure 3 is a plan view corresponding to Figure 1.

Figure 4 is a diagrammatic view of the detecting control means for the panning device and baking tin conveyor.

Figure 5 is a diagrammatic side elevation of a modification of the detecting control means of Figure 4, incorporating a light-sensitive cell and relay for electrically controlling the operation of the panning device and baking tin conveyor. Like parts in Figures 4 and 5 are designated by like numbers.

Figure 6 is a fragmentary diagrammatic plan view of the structure of Figure 5, showing the arrangement of the light-source and the light sensitive cell relative to the mechanism which handles the dough pieces.

In carrying the invention into effect according to one convenient mode, as for example, in the production of 2-pound loaves of the laminated structure indicated above, a dough divider is provided for dividing equal-weight 4-ounce pieces and delivering these to a conveyor which passes the dough pieces to a rounding machine. From the rounding machine the dough pieces are continuously delivered to another conveyor which carries the succession of dough pieces to a proofer into which they may be fed by hand or automatically. After the pieces have passed through the proofer for an appropriate period they are discharged by a bucket conveyor or any other suitable means capable of delivering the dough pieces in a more or less uniformly spaced relationship. They are delivered to reshaping or rounding mechanism of known kind, so that any aberrations or departures from the spherical shape which have occurred during proofing, may be corrected. From the reshaping means the dough pieces are passed to pressing means to flatten them to circular cake or disc form. The operation may be effected by passing them between a pair of rollers or between a series of pairs of rollers adapted progressively to form the spheres into flat discs. A final pair of flattening rollers may be employed which are set about three-eighths inch apart so that relatively thin dough pieces are delivered. According to one convenient arrangement, shown in Figures 1 and 2, the final flattening is effected between a roller 5 and a conveyor belt 6 which is carried around a roller 7 adjustably mounted by eccentric means 8, whereby the distance between the roller 5 and the conveyor lap may be varied. After the flattening between the rollers it will be appreciated that the dough pieces will recover somewhat in thickness.

Figure 1:
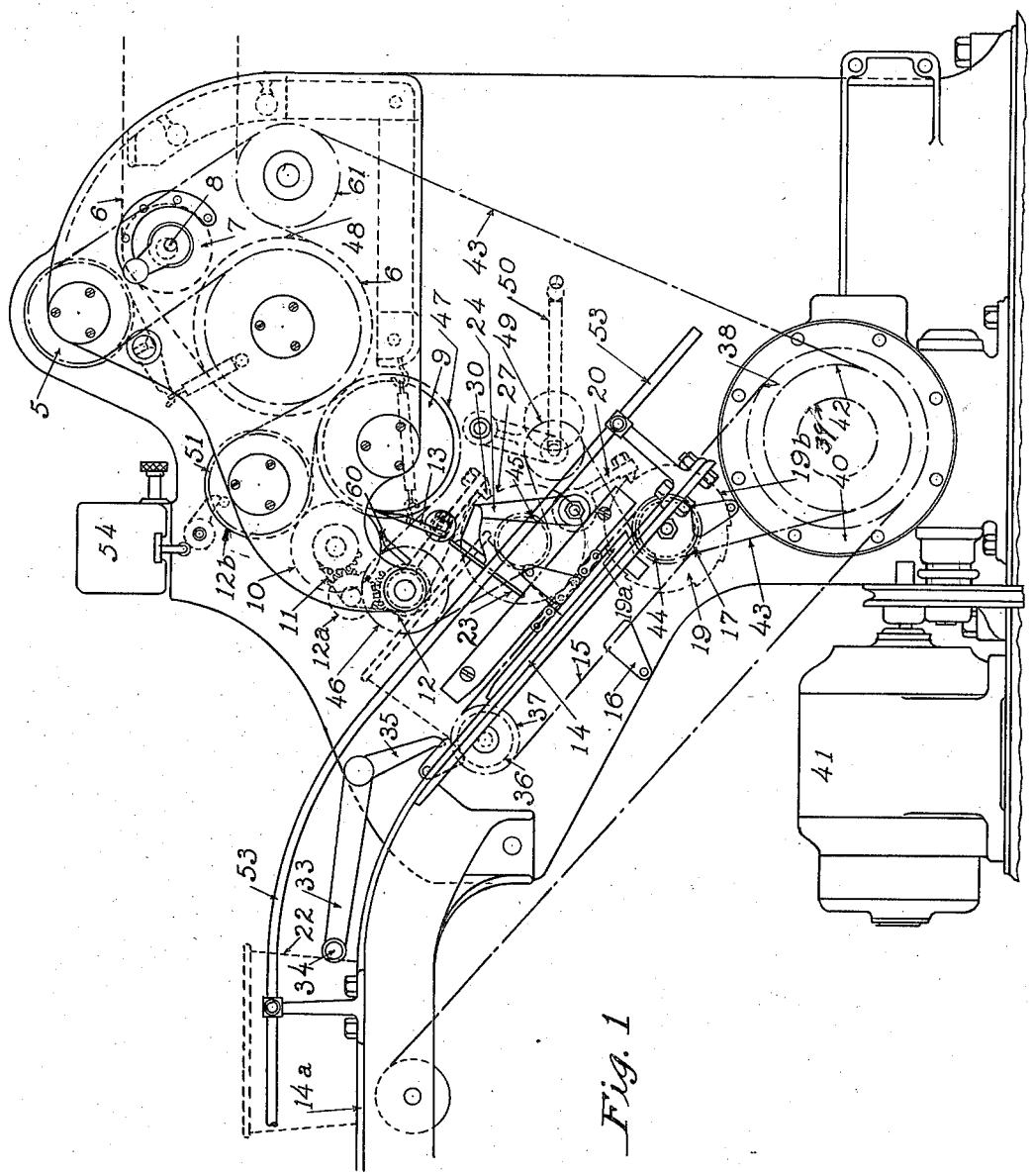

The flattened pieces are discharged by the conveyor 6 to a pair of rollers 9 and 10 located at a slightly lower level, (see Figure 1). The lower roller 9 of this pair is driven whilst the upper roller 10 may rotate idly. It is preferred, however, that both rollers should be driven.

The upper roller 10 is displaceably mounted and serves also as a detecting mechanism. The detecting roller is mounted upon a hinged or pivoted bracket 11 which positions the roller with a normal clearance of about one-fourth inch from its companion driven roller 9, the arrangement being such that, when a dough piece passes between the two rollers, the detecting roller 10 is displaced outwardly. The drive to the roller 10 is obtained by spur gears 12, 12a, 12b, the gear 12 being power-driven and located upon the pivotal axis of the bracket 11, while the gears 12a, 12b are carried by the bracket.

It is preferred to arrange the detecting roller 10 and its companion roller 9 so that the dough pieces are delivered downwardly at a steep angle. The rollers are provided with scrapers 60 and 13. The scraper 60 for the lower roller 9 is also adapted to act as a short guide or chute for the dough pieces discharged from between the rollers.

Figure 2:
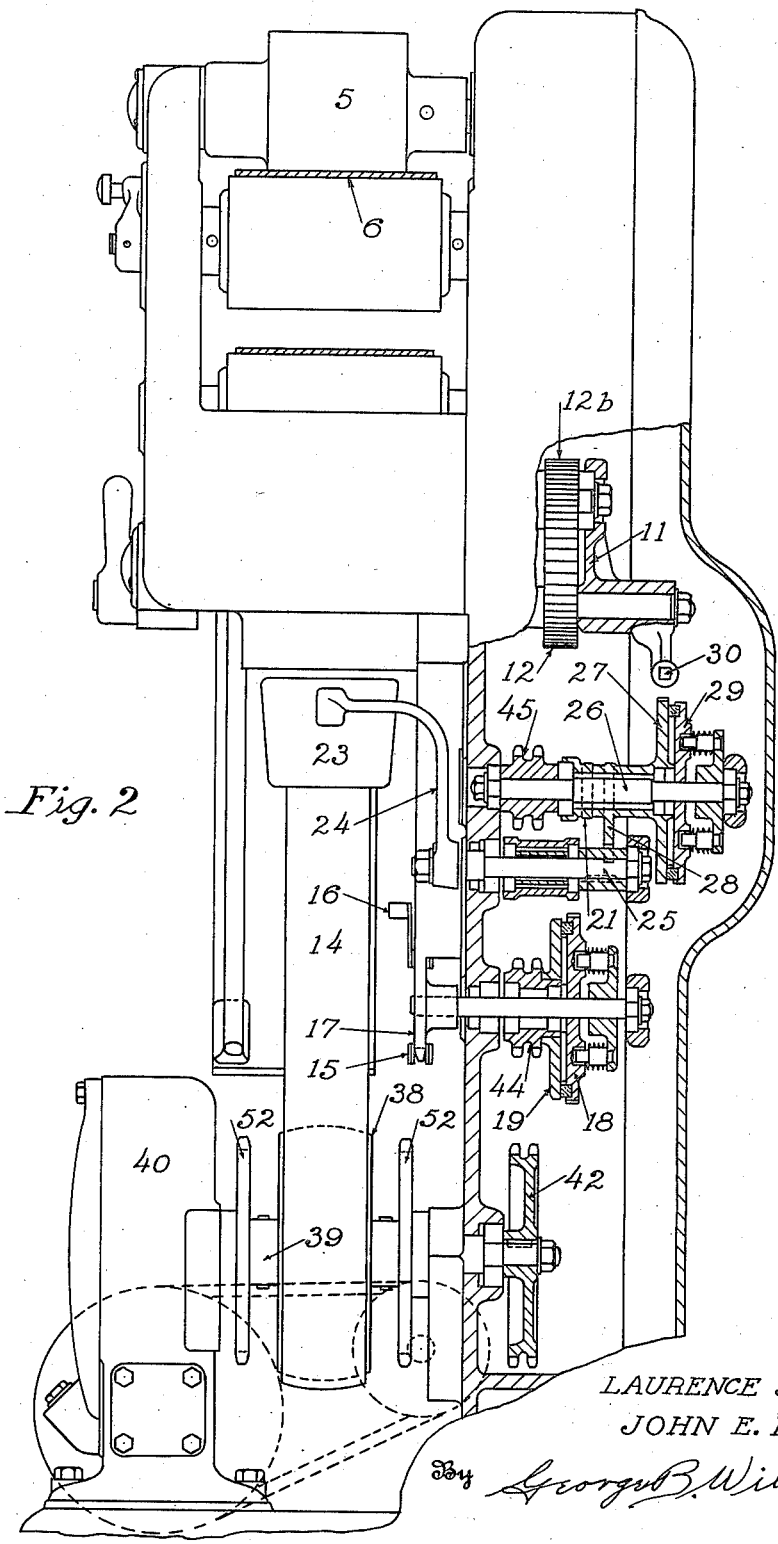
Figure 2 is an end view partly in section looking from the right in Figure 1.

The outward movement of the detector roller 10 is adapted to actuate a trigger device which releases feeding mechanism for the bread tins and mechanism for operating the panning device which guides the dough pieces into place in the tins. The tins slide on an inclined platform or conveyor 14 positioned preferably at some 45° to the horizontal, and their travel from the higher elevation to the lower is governed by a chain or other conveying mechanism. According to the preferred arrangement, a chain 15 is provided with a series of studs or projecting pins 16 which are adapted to engage the front end of each tin so as to maintain an equal spacing relationship between the tins as they pass down the incline. Chain 15 is the "conveyor" referred to in the appended claims. Referring to Figure 2, the conveyor 15 passes over a control chain wheel 17 driven through a slip friction clutch 18 intermittently in steps, as determined by the action of detecting roller 10. In one form, see also Figure 4, a ratchet wheel 19 is provided which has a series of teeth 19a corresponding in number (eight in this case) with the number of steps through which each tin is intended to be fed, a larger step or tooth 19b being provided between the beginning and termination of the series of teeth to afford a larger step to the conveyor corresponding with the spacing interval between the position of the dough piece last deposited in one tin and the position of the first dough piece in the next succeeding tin. The ratchet wheel 19 is engaged by a pawl 20 operated in one direction by a cam 21 and normally held in the engaged position by spring means, not shown.

The panning means for guiding or feeding the dough pieces delivered from the detecting roller into the tin 22 comprises a reciprocating blade 23, corresponding in shape and size to the inside of the tins. The plate or blade is mounted upon a pivoted lever or levers 24, so that it may be moved into a position approximately perpendicular to the bottom of the tin, and to a position in which it is withdrawn clear of the tin, as shown in broken lines in Figure 4. According to one arrangement, the blade may be mounted upon the lever 24 and rocked about a shaft 25, parallel with the axis of the detecting roller 10, and given an arcuate movement into and out of its operative position. In the operative position the blade preferably lies just clear of the dough piece last placed in position in the tin and is adapted to act as a support or guideway for the dough piece next to be introduced.

An actuating shaft 26, for the panning blade, and for the tin conveyor pawl is continuously driven and loosely carries a single toothed disc 27 coupled to a pair of cams 21 and 28, see Fig. 2. This toothed control disc has a slip friction clutch 29 connecting it with the shaft 26 so that the disc 27 constantly tends to be driven by the shaft but is stopped at certain times by the engagement of a detent 30 operated by the detecting roller 10. When the detecting roller is displaced outward from its companion roller 9 by a dough piece, the detent 30 is lifted from the tooth of the control disc 27 permitting it and the cams 21, 28 to rotate. Cam 21 momentarily releases the ratchet wheel 19 of the pan conveyor by releasing the pawl 20. Pawl 20 is then immediately restored to its engaged position so that wheel 19 can rotate only until the next tooth engages the pawl to give the necessary stepwise movement to the pan receiving the dough pieces. The other cam 28 causes the panning blade 23 to be oscillated from its operative position within the tin as shown in solid lines in Figure 4 to the position shown in broken lines. The shape and angular position of the panning blade cam 28 is such that during one revolution, the panning blade is moved from its operative position within the tin, out of the tin to position the piece just deposited and back again for the next piece. While the blade 23 is out of the tin, the cam 21 releases the detent 20 to permit the tin conveyor to advance one step. Immediately a dough piece has passed the detecting roller 10, it is displaced inwardly again and the detent 30 rests on the ratchet disc 27 ready for engagement with the next tooth on the disc.

According to this form of the invention, it will be seen that for each detection of a dough piece passing between the rollers 9 and 10, the control disc 27 and the cams 21 and 28 make one revolution and accomplish one cycle of operations, comprising one operation of the panning blade 23 and a stepwise movement of the tin conveyor 15.

Both the panning blade and the baking tin make a series of operations corresponding with the number of pieces to be fed to the tin (eight in the machine illustrated). Each operation is timed and brought into effect only when a dough piece displaces the detecting roller 10. Thus dough pieces will be reliably and positively fed to the tin, whether the feed to the detecting roller is regular or not, the stepwise movement of the tins and the action of the panning blade is positively synchronized with the gravity delivery of the dough pieces from the detecting device.

Figures 5 and 6 show a modification of the mechanism described above for controlling the operation of the panner blade and the baking tin conveyor. At one end of roller 9 is mounted a lamp 70 arranged to throw a beam of light across the surface of the roller. A light-sensitive cell and relay 71 of known type is positioned at the other end of roller 9 in the path of the light beam from lamp 70. The cell and relay 71 is connected to a power supply 72 and to an electromagnet 73. An armature 74 is positioned in the field of magnet 73 and fixed to one arm 75 of a bell-crank lever, the other end of which carries a pawl 30, engaging the ratchet disc 27. Disc 27 and the mechanism which it governs are identical in construction and operation with that of Figure 4. A spring 76 connected to lever arm 75 opposes the action of the solenoid 73 and normally holds pawl 30 in contact with the periphery of ratchet wheel 27.

The light-sensitive cell 71 is operative to hold the circuit to solenoid 73 open so long as the light beam from the lamp 70 is uninterrupted. When a dough piece passes over roller 9 and intercepts the light beam, cell 71 momentarily energizes the solenoid 73, rocking arm 75 of the bell-crank to the left in Fig. 5, and lifting the pawl 30. Disc 27 is then permitted to rotate until the next tooth engages pawl 30, so that panner 23 operates once and the baking tin advances one step.

Referring to Figs. 1 and 3, the delivery of the tins 22 from the upper horizontal position 14a of the tin conveyor 14 to the loading position is controlled by a trigger device comprising a pivoted bell-crank lever, one arm 33 of which carries a pin 34 adapted normally to lie in front of and arrest the first tin of the series. The other arm 35 of the lever lies in the path of a detent 36, carried by the shaft of the upper guide wheel 37 of the chain 15. The tins on the conveyor 14 pass between guide rails 53.

The conveyor 14 derives its movement from a pulley 38 on the main shaft 39 which is driven through the reduction gearing 40 from the electric motor 41, see Figures 1 and 2. The shaft 39 also carries a sprocket wheel 42 by which the chain 43 is driven. The chain 43 is adapted to drive the clutch device 18 by the sprocket wheel 44; the clutch 29 by the sprocket wheel 45; the gear 12 of the detecting roller 10 by the sprocket wheel 46; the lower roller 9 by the sprocket wheel 47; the drum 48 of the conveyor 6 and the flattening roll 5, the return lap then passing over an idle sprocket 61. A tension device comprising a sprocket wheel 49 and a spring 50 is provided. The chain is also adapted to rotate a tappet wheel 51 for agitating a flour dusting device 54, for the rollers 9 and 10.

The shaft 39 is also provided with sprocket wheels 52 for driving a take off conveyor for the loaded tins.

It is to be understood that while the invention has been shown and described in connection with the employment of inclined baking tins, it may also be carried into effect with reference to tins on end or horizontally arranged tins.

Having now particularly described and shown the nature of our invention, what we claim to be new and desire to protect by Letters Patent is:

1. Mechanism for feeding dough pieces to a baking tin or a container comprising a panner blade mounted for endwise translatory movement to and away from the bottom of said tin, and means for moving said panner blade alternately within the tin for depositing or guiding a dough piece edgewise into the tin, and out of the tin clear of the pieces deposited therein.

2. Mechanism for feeding dough pieces to a baking tin or a container, comprising a panner blade movable endwise approximately perpendicularly to and away from the bottom of said tin for feeding dough pieces in succession on edge into said tin, means for imparting such motion to said panner blade, and means for giving the tin a travel transversely to the direction of the relative movement of said blade and tin.

3. In a machine for feeding dough pieces having means for moving a container past a delivery point and a panner blade movable into and out of co-operative relationship with said container for depositing or guiding the dough pieces one-by-one thereinto, in combination, a detecting device actuated by the passage of the dough pieces toward said delivery point and arranged to control the operation of said panner blade and the travel of said container.

4. Mechanism as claimed in claim 3 wherein the detecting device comprises a displaceable roller located in the path of the dough pieces, in combination with means for releasably holding the drive mechanism for the panner blade and the means for moving the container, said roller operable when displaced by the passage of a dough piece to release said holding means and permit the operation of said panner blade and the movement of said container.

5. Mechanism as claimed in claim 3, wherein the detecting device comprises a light-sensitive cell, arranged and electrically connected to put the panner blade and the means for moving the container into operation when a beam of light is interrupted by the passage of a dough piece toward the delivery point.

6. A machine as claimed in claim 3 having a conveyor adapted to feed the container along an inclined path and driving means for said conveyor, wherein the detecting device controls the operation of said conveyor driving means to impart to the conveyor a step-by-step travel and also controls the panner blade to cause it to operate in timed relation to the travel of the conveyor.

7. A machine as claimed in claim 3 having a conveyor adapted to feed a file of containers along an inclined path, driving means for said conveyor adapted to impart motion thereto in a series of equal steps in accordance with the number of dough pieces to be delivered to a container, and then to give the conveyor a single longer stepwise movement corresponding to the gap between consecutive containers, wherein the detecting device, upon each passage of a dough piece, causes said driving means to advance the conveyor one step in the entire series of steps set forth.

8. Mechanism as claimed in claim 3 having a conveyor adapted to feed the container along an inclined path, a drive shaft for said conveyor, means for releasably holding said conveyor drive shaft against rotation, a power-driven cam shaft having a pair of cams, one of which is operable to actuate the panner blade, the other to release said conveyor drive shaft, and means for releasably holding said cam shaft, wherein the detecting device comprises a displaceable roller located in the path of the dough pieces, and mechanism is provided operable by the displacement of said roller for releasing said cam shaft to actuate the panner blade and advance the container.

9. A machine as claimed in claim 3, having a conveyor adapted to feed the container along an inclined path, wherein a file of empty containers are held back from said conveyor by a stop which is displaced to release the first container in the file by a cam or detent carried by the conveyor.

JOHN EDWARD POINTON.
LAURENCE SEYMOUR HARBER.